United States Patent
Yan

(10) Patent No.: US 11,711,605 B2
(45) Date of Patent: Jul. 25, 2023

(54) PHOTOGRAPHING PARAMETER ADJUSTMENT METHOD, AND MOBILE TERMINAL

(71) Applicant: VIVO MOBILE COMMUNICATION CO., LTD., Guangdong (CN)

(72) Inventor: Chao Yan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 86 days.

(21) Appl. No.: 17/560,077

(22) Filed: Dec. 22, 2021

(65) Prior Publication Data

US 2022/0116533 A1   Apr. 14, 2022

Related U.S. Application Data

(63) Continuation of application No. PCT/CN2020/084928, filed on Apr. 15, 2020.

(30) Foreign Application Priority Data

Jun. 25, 2019  (CN) .......................... 201910553975.X

(51) Int. Cl.
*H04N 23/62*   (2023.01)
*H04M 1/72454*   (2021.01)
(Continued)

(52) U.S. Cl.
CPC .......... *H04N 23/62* (2023.01); *H04M 1/0216* (2013.01); *H04M 1/0268* (2013.01);
(Continued)

(58) Field of Classification Search
CPC ............ G06F 3/04886; G06F 3/04845; G06F 3/04847; G06F 1/1652; G06F 1/1641;
(Continued)

(56) References Cited

U.S. PATENT DOCUMENTS 8,130,207 B2 *   3/2012   Nurmi ................... G06F 3/0488
                                                345/173
9,377,873 B2 *   6/2016   Lee .......................... G06F 3/016
(Continued)

FOREIGN PATENT DOCUMENTS

CN        102067070 A    5/2011
CN        103197879 A    7/2013
(Continued)

OTHER PUBLICATIONS

First Office Action of Priority Application No. CN 201910553975.X issued by the Chinese Patent Office dated Sep. 23, 2020.
(Continued)

*Primary Examiner* — Pritham D Prabhakher
(74) *Attorney, Agent, or Firm* — IP & T Group LLP

(57) ABSTRACT

A photographing parameter adjustment method includes: receiving a touch operation performed on the foldable display; in a process of receiving the touch operation, receiving a folding operation performed on the foldable display; and adjusting a photographing parameter of the camera module based on a touch position of the touch operation and a folding angle of the foldable display.

15 Claims, 7 Drawing Sheets

(51) Int. Cl.
*H04M 1/02* (2006.01)
*H04N 23/611* (2023.01)
*H04N 23/63* (2023.01)

(52) U.S. Cl.
CPC ...... *H04M 1/72454* (2021.01); *H04N 23/611* (2023.01); *H04N 23/631* (2023.01)

(58) Field of Classification Search
CPC ................ G06F 1/1686; G06F 1/1677; G06F 2203/04806; H04N 23/62; H04N 23/611; H04N 23/631; H04N 23/69; H04N 23/67; H04N 23/531; H04M 1/0216; H04M 1/0241; H04M 1/0268; H04M 1/72454; H04M 2250/52
USPC ....................................................... 348/222.1
See application file for complete search history.

(56) References Cited

U.S. PATENT DOCUMENTS

| | | | | |
|---|---|---|---|---|
| 9,639,175 | B2* | 5/2017 | Cho | G06F 3/04845 |
| 9,672,796 | B2* | 6/2017 | Son | G09G 5/40 |
| 9,823,756 | B2* | 11/2017 | Kwak | G06F 3/041 |
| 9,910,539 | B2* | 3/2018 | Jin | G06F 1/1643 |
| 9,936,138 | B2* | 4/2018 | Park | H04N 23/62 |
| 10,409,540 | B2* | 9/2019 | Cho | H04M 1/0268 |
| 10,666,780 | B2* | 5/2020 | Cho | G06F 1/1686 |
| 10,705,716 | B2* | 7/2020 | Sang | G06F 1/1626 |
| 11,048,379 | B2* | 6/2021 | Cheong | G06F 3/04842 |
| 2009/0315834 | A1 | 12/2009 | Nurmi et al. | |
| 2013/0176248 | A1 | 7/2013 | Shin et al. | |
| 2013/0215088 | A1* | 8/2013 | Son | G06F 3/04897 345/204 |
| 2015/0015513 | A1 | 1/2015 | Kwak et al. | |
| 2015/0022472 | A1 | 1/2015 | Jung et al. | |
| 2015/0153778 | A1* | 6/2015 | Jung | G06F 1/1677 345/156 |
| 2015/0220195 | A1 | 8/2015 | Jin et al. | |
| 2015/0286288 | A1 | 10/2015 | Lee et al. | |
| 2015/0355728 | A1 | 12/2015 | Cho et al. | |
| 2015/0381929 | A1* | 12/2015 | Lee | H04N 23/57 348/14.03 |
| 2016/0198100 | A1* | 7/2016 | Cho | H04M 1/0268 348/222.1 |
| 2017/0034446 | A1 | 2/2017 | Park et al. | |
| 2018/0039387 | A1 | 2/2018 | Cheong et al. | |
| 2018/0342226 | A1* | 11/2018 | Shin | G06F 3/0487 |
| 2019/0028579 | A1* | 1/2019 | Cho | G06F 3/04886 |
| 2019/0155475 | A1 | 5/2019 | Sang et al. | |
| 2020/0249834 | A1 | 8/2020 | Seo et al. | |

FOREIGN PATENT DOCUMENTS

| | | |
|---|---|---|
| CN | 105556450 A | 5/2016 |
| CN | 105579949 A | 5/2016 |
| CN | 105843574 A | 8/2016 |
| CN | 105938426 A | 9/2016 |
| CN | 107656683 A | 2/2018 |
| CN | 107688370 A | 2/2018 |
| CN | 107770442 A | 3/2018 |
| CN | 107846515 A | 3/2018 |
| CN | 108111750 A | 6/2018 |
| CN | 108810403 A | 11/2018 |
| CN | 108845711 A | 11/2018 |
| CN | 109120850 A | 1/2019 |
| CN | 109639971 A | 4/2019 |
| CN | 110312073 A | 10/2019 |
| KR | 10-2016-0092877 A | 8/2016 |
| WO | 2016/142757 A1 | 9/2016 |

OTHER PUBLICATIONS

International Search Report and Written Opinion of International Application No. PCT/CN2020/084928 dated Jul. 6, 2020.

* cited by examiner

PHOTOGRAPHING PARAMETER ADJUSTMENT METHOD, AND MOBILE TERMINAL

CROSS-REFERENCE TO RELATED APPLICATIONS

This application is a Bypass Continuation Application of PCT/CN2020/084928 filed on Apr. 15, 2020, which claims priority to Chinese Patent Application No. 201910553975.X filed on Jun. 25, 2019, which are incorporated herein by reference in their entirety.

TECHNICAL FIELD

Embodiments of the present disclosure relate to the field of communications technologies, and in particular, to a photographing parameter adjustment method and a mobile terminal.

BACKGROUND

With development of terminal technologies, functions of a mobile terminal are more and more diverse. For example, a photographing function has become a basic function of the related mobile terminal. When performing photographing by using the mobile terminal, a user may adjust a photographing parameter of a camera module of the mobile terminal based on a requirement of the user, such as a focal length, an aperture, or an exposure.

SUMMARY

According to a first aspect, an embodiment of the present disclosure provides a photographing parameter adjustment method, applied to a mobile terminal, where the mobile terminal includes a camera module and a foldable display, and the method includes:

receiving a touch operation performed on the foldable display;

in a process of receiving the touch operation, receiving a folding operation performed on the foldable display; and adjusting a photographing parameter of the camera module based on a touch position of the touch operation and a folding angle of the foldable display.

Optionally, the adjusting a photographing parameter of the camera module based on a touch position of the touch operation and a folding angle of the foldable display includes:

determining an adjustment step size of the photographing parameter based on the touch position of the touch operation;

determining a weight coefficient of the adjustment step size based on a change value of the folding angle of the foldable display; and adjusting the photographing parameter of the camera module based on the adjustment step size and the weight coefficient.

Optionally, the determining an adjustment step size of the photographing parameter based on the touch position of the touch operation includes:

determining a shortest distance between the touch position of the touch operation and a first side of the foldable display; and determining an adjustment step size corresponding to the shortest distance as the adjustment step size of the photographing parameter.

Optionally, the foldable display includes N foldable screen areas, and N is an integer greater than 2; and the determining an adjustment step size of the photographing parameter based on the touch position of the touch operation includes:

in a case that the touch position of the touch operation is in a preset area, determining the adjustment step size of the photographing parameter based on a screen area corresponding to the change value of the folding angle.

Optionally, the adjusting a photographing parameter of the camera module based on a touch position of the touch operation and a folding angle of the foldable display includes:

adjusting the photographing parameter of the camera module based on the touch position of the touch operation, the folding angle of the foldable display, and an adjustment direction of the photographing parameter.

Optionally, before the adjusting the photographing parameter of the camera module based on the touch position of the touch operation, the folding angle of the foldable display, and an adjustment direction of the photographing parameter, the method further includes:

determining the adjustment direction of the photographing parameter based on a folding direction of the foldable display.

Optionally, the foldable display includes N foldable screen areas, and N is an integer greater than 2; and before the adjusting the photographing parameter of the camera module based on the touch position of the touch operation, the folding angle of the foldable display, and an adjustment direction of the photographing parameter, the method further includes:

determining the adjustment direction of the photographing parameter based on the screen area corresponding to the change value of the folding angle.

According to a second aspect, an embodiment of the present disclosure further provides a mobile terminal, where the mobile terminal includes a camera module and a foldable display, and the mobile terminal includes:

a first receiving module, configured to receive a touch operation performed on the foldable display;

a second receiving module, configured to: in a process of receiving the touch operation, receive a folding operation performed on the foldable display; and an adjustment module, configured to adjust a photographing parameter of the camera module based on a touch position of the touch operation and a folding angle of the foldable display.

Optionally, the adjustment module includes:

a first determining unit, configured to determine an adjustment step size of the photographing parameter based on the touch position of the touch operation;

a second determining unit, configured to determine a weight coefficient of the adjustment step size based on a change value of the folding angle of the foldable display; and an adjustment unit, configured to adjust the photographing parameter of the camera module based on the adjustment step size and the weight coefficient.

Optionally, the first determining unit is further configured to:

determine a shortest distance between the touch position of the touch operation and a first side of the foldable display; and determine an adjustment step size corresponding to the shortest distance as the adjustment step size of the photographing parameter.

Optionally, the foldable display includes N foldable screen areas, and N is an integer greater than 2; and the first determining unit is configured to:

in a case that the touch position of the touch operation is in a preset area, determine the adjustment step size of the photographing parameter based on a screen area corresponding to the change value of the folding angle.

Optionally, the adjustment module is configured to:

adjust the photographing parameter of the camera module based on the touch position of the touch operation, the folding angle of the foldable display, and an adjustment direction of the photographing parameter.

Optionally, the mobile terminal further includes:

a third determining module, configured to: before the photographing parameter of the camera module is adjusted based on the touch position of the touch operation, the folding angle of the foldable display, and the adjustment direction of the photographing parameter, determine the adjustment direction of the photographing parameter based on a folding direction of the foldable display.

Optionally, the foldable display includes N foldable screen areas, and N is an integer greater than 2; and the mobile terminal further includes:

a fourth determining module, configured to: before the photographing parameter of the camera module is adjusted based on the touch position of the touch operation, the folding angle of the foldable display, and the adjustment direction of the photographing parameter, determine the adjustment direction of the photographing parameter based on the screen area corresponding to the change value of the folding angle.

According to a third aspect, an embodiment of the present disclosure further provides a mobile terminal. The mobile terminal includes a processor, a memory, and a computer program that is stored in the memory and executable on the processor, and when the computer program is executed by the processor, the steps of the foregoing photographing parameter adjustment method are implemented.

According to a fourth aspect, an embodiment of the present disclosure further provides a non-transitory computer-readable storage medium. The non-transitory computer-readable storage medium stores a computer program, and when the computer program is executed by a processor, the steps of the foregoing photographing parameter adjustment method are implemented.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The terms "first", "second", and the like in the present disclosure are intended to distinguish between similar subjects but do not necessarily describe a particular sequence or order. In addition, terms "include", "have", and any variant thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in the present disclosure, "and/or" is used to indicate at least one of connected objects, for example, A and/or B and/or C, and to indicate seven cases: only A, only B, only C, A and B, B and C, A and C, and A, B and C.

Figure 1:
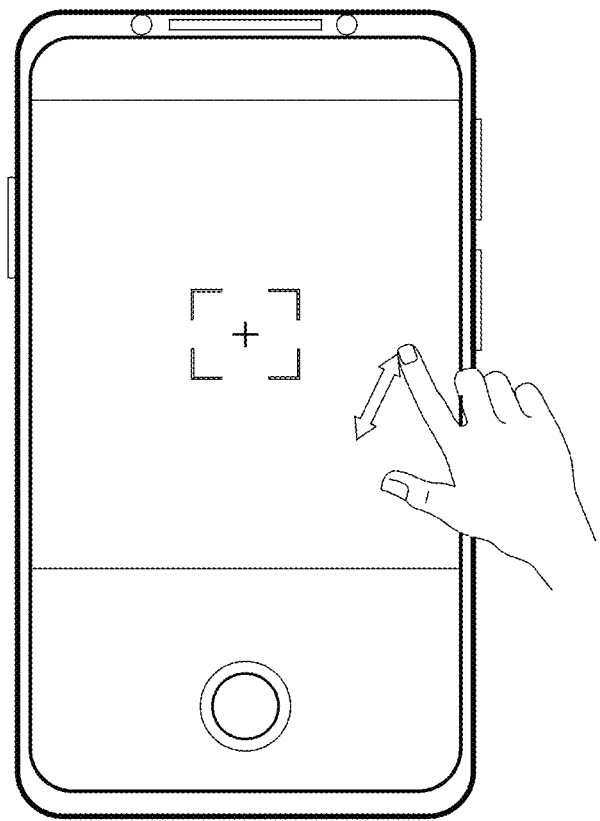
FIG. 1 is a first schematic diagram of a focal length adjustment manner of a related camera module.

Adjustment of the related photographing parameter is implemented by sliding a finger on a screen. For example, a related zoom solution is implemented by sliding two fingers on the screen. As shown in FIG. 1, it can be learned that in a related photographing parameter adjustment method, the user needs to perform a relatively fine finger action to adjust the photographing parameter. Consequently, it has a difficulty in control and operation efficiency is relatively low.

A photographing parameter adjustment method in the embodiments of the present disclosure may be applied to a mobile terminal. The mobile terminal includes a camera module and a foldable display. It should be understood that the foldable display includes at least two foldable screen areas. In addition, in a case that the foldable display includes N foldable screen areas, and N is an integer greater than 2, each two adjacent foldable screen areas may form one folding angle. Therefore, it can be understood that each folding angle corresponds to two foldable screen areas.

For ease of understanding, an example in which the foldable display includes a screen area A, a screen area B, and a screen area C that are connected in sequence is used for description. In this example, the screen area A and the screen area B may form a first folding angle, and the first folding angle corresponds to the screen area A and the screen area B; and the screen area B and the screen area C may form a second folding angle, and the second folding angle corresponds to the screen area B and the screen area C.

In actual application, the mobile terminal may be a mobile phone, a tablet personal computer, a laptop computer, a personal digital assistant (PDA), a mobile Internet device (MID), a wearable device, or the like.

The following describes the photographing parameter adjustment method in the embodiments of the present disclosure.

Figure 2:
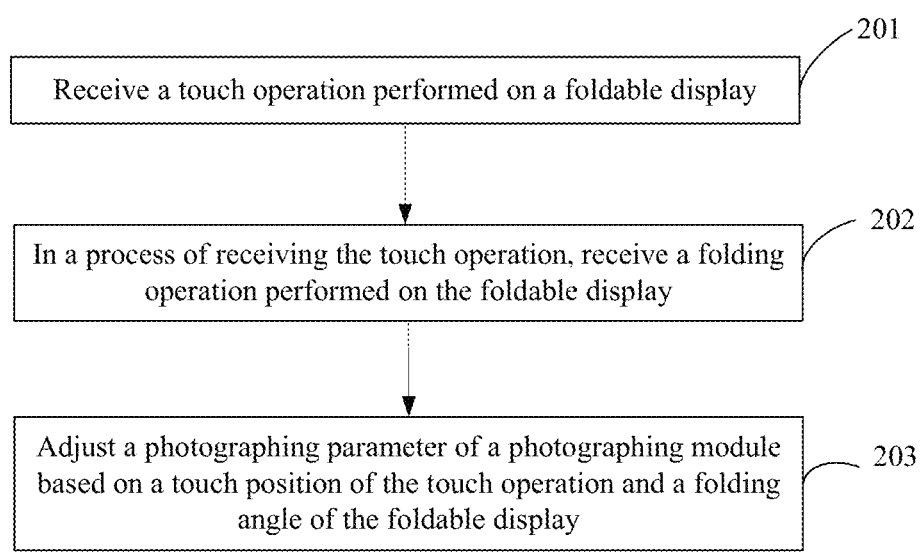
FIG. 2 is a first flowchart of a photographing parameter adjustment method according to an embodiment of the present disclosure.

Referring to FIG. 2, FIG. 2 is a first flowchart of a photographing parameter adjustment method according to an embodiment of the present disclosure. As shown in FIG. 2, the photographing parameter adjustment method may include the following steps.

Step 201: Receive a touch operation performed on a foldable display.

Step 202: In a process of receiving the touch operation, receive a folding operation performed on the foldable display.

In this embodiment of the present disclosure, a mobile terminal performs step 203 only when both the touch operation and the folding operation are received. It should be noted that a sequence of an initial moment at which the mobile terminal receives the touch operation and an initial moment at which the mobile terminal receives the folding operation is not limited in the present disclosure.

Figure 3:
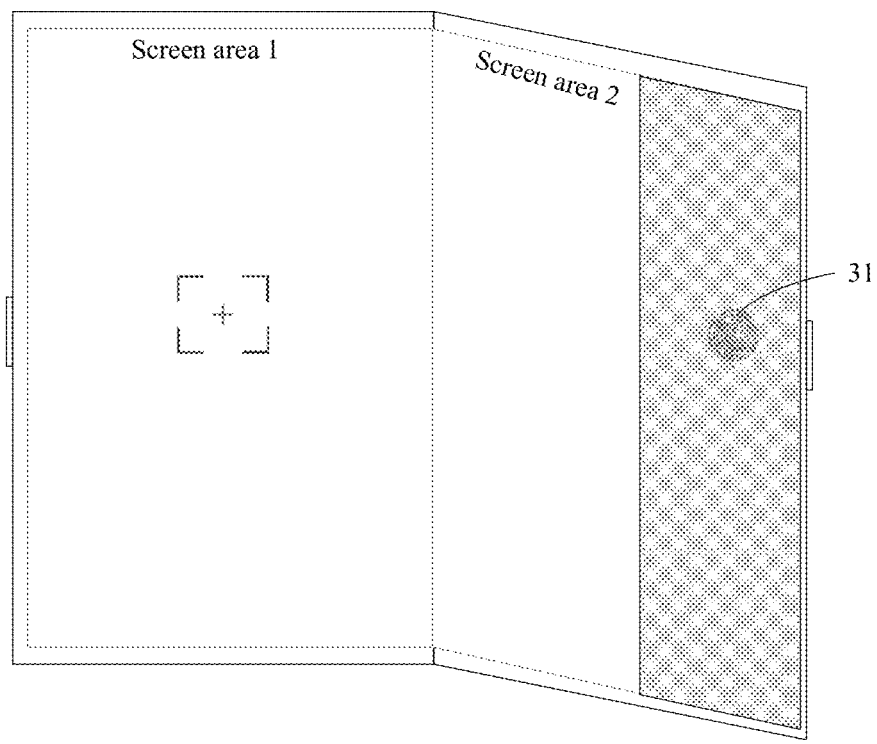
FIG. 3 is a first schematic diagram of a foldable display according to an embodiment of the present disclosure.

In some implementations, in a process of receiving the folding operation on the foldable display, the mobile terminal may receive the touch operation performed on the foldable display. That is to say, even if it is detected that a folding angle of the foldable display changes, the mobile terminal further needs to determine, by determining whether the touch operation performed on the foldable display is received, whether to adjust a photographing parameter of a camera module. For example, if the touch operation performed on the foldable display is received, and a touch position 31 of the touch operation on the foldable display is shown in FIG. 3, the photographing parameter may be adjusted; otherwise, the photographing parameter is not adjusted. It can be learned that, in this embodiment of the present disclosure, receiving the touch operation performed on the foldable display is a necessary trigger condition for the mobile terminal to adjust the photographing parameter.

It should be understood that the foldable display in FIG. 3 includes a foldable screen area 1 and a foldable screen area 2. However, the foldable display in this embodiment of the present disclosure may include more than two screen areas, and a specific form of the foldable display is not limited thereto.

Step 203: Adjust a photographing parameter of a camera module based on a touch position of the touch operation and a folding angle of the foldable display.

During specific implementation, in an implementation, the mobile terminal may adjust the photographing parameter of the camera module based on a folding angle change value of the foldable display and the touch position of the touch operation.

In another implementation, the mobile terminal may adjust the photographing parameter of the camera module based on an angle obtained by folding the foldable display and the touch position of the touch operation.

In actual application, the photographing parameter may include at least one of: a focal length, an aperture, or an exposure, which may be determined based on an actual situation, and is not limited in this embodiment of the present disclosure.

According to the photographing parameter adjustment method in this embodiment, the mobile terminal may adjust the photographing parameter of the camera module based on the folding angle of the foldable display and the touch position of the touch operation. It can be learned that a user may adjust the photographing parameter of the camera module by performing the folding operation on the foldable display, so that adjustment of the photographing parameter of the camera module is more easily controlled than that in the related art, thereby improving operation efficiency of adjusting the photographing parameter.

The following describes the implementation in which the mobile terminal may adjust the photographing parameter of the camera module based on the folding angle change value of the foldable display and the touch position of the touch operation.

Optionally, the adjusting a photographing parameter of the camera module based on a touch position of the touch operation and a folding angle of the foldable display includes:

determining an adjustment step size of the photographing parameter based on the touch position of the touch operation;

determining a weight coefficient of the adjustment step size based on a change value of the folding angle of the foldable display; and adjusting the photographing parameter of the camera module based on the adjustment step size and the weight coefficient.

In this implementation, during specific implementation, the mobile terminal may determine the adjustment step size of the photographing parameter based on the touch position of the touch operation in the following two manners.

Manner 1

Optionally, the determining an adjustment step size of the photographing parameter based on the touch position of the touch operation includes:

determining a shortest distance between the touch position of the touch operation and a first side of the foldable display; and determining an adjustment step size corresponding to the shortest distance as the adjustment step size of the photographing parameter.

Figure 4A:
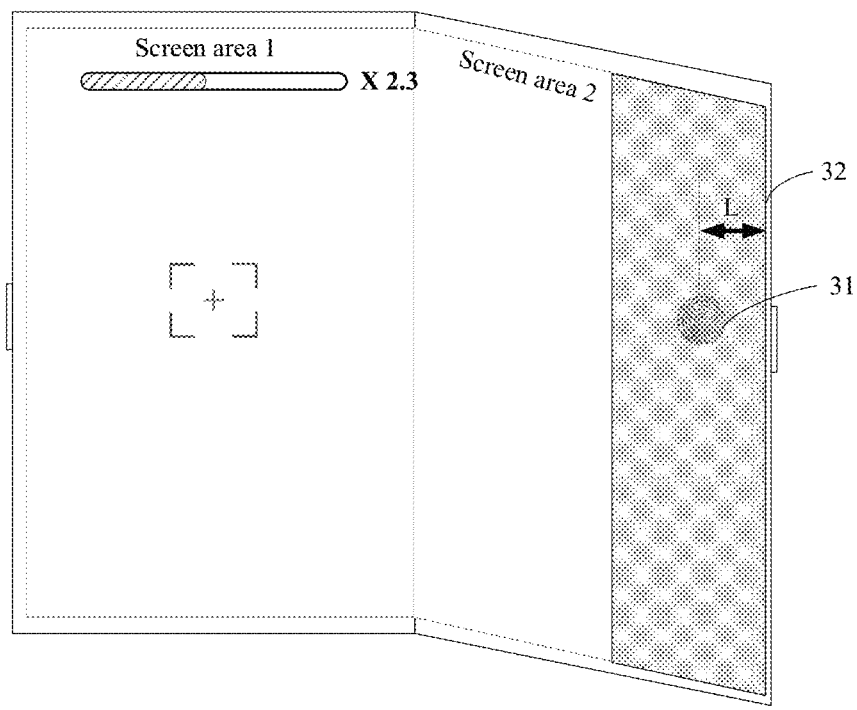
FIG. 4A is a second schematic diagram of a foldable display according to an embodiment of the present disclosure.

In this manner, the mobile terminal may prestore a correspondence between a distance interval and the adjustment step size. During specific implementation, optionally, as shown in FIG. 4A, after determining a shortest distance L between the touch position 31 of the touch operation and a first side 32, the mobile terminal may determine a distance interval in which the shortest distance falls, consider an adjustment step size corresponding to the distance interval as an adjustment step size corresponding to the shortest distance, and determine the adjustment step size as the adjustment step size of the photographing parameter. The first side may be any side of the foldable display. This may be specifically determined based on an actual requirement, and is not limited in this embodiment of the present disclosure.

In this manner, optionally, in the foregoing correspondence, the adjustment step size may be positively correlated with a maximum value of the distance interval. That is, if the maximum value of the distance interval is larger, the adjustment step size corresponding to the distance interval is larger; otherwise, the adjustment step size is smaller.

Figure 4B:
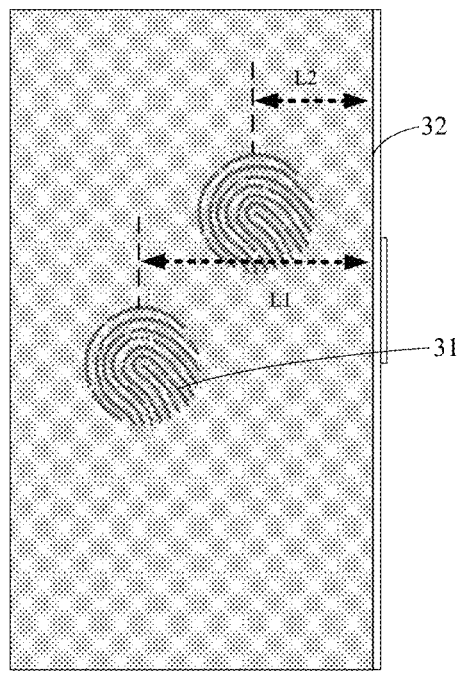
FIG. 4B is a third schematic diagram of a foldable display according to an embodiment of the present disclosure.

In this way, a user may flexibly adjust the adjustment step size of the photographing parameter by adjusting the shortest distance between the touch position and the first side. For example, in a case that a different between a current value of the photographing parameter and an expected value is relatively large, the touch position of the operating body may be controlled to be far away from the first side, so that the shortest distance is L1 shown in FIG. 4B, to implement coarse adjustment of the photographing parameter. When the current value of the photographing parameter is relatively close to the expected value, the touch position of the operation body may be controlled to be close to the first side, so that the shortest distance is L2 shown in FIG. 4B, to implement fine adjustment of the photographing parameter, thereby further improving efficiency of adjusting the photographing parameter.

Certainly, in the foregoing correspondence, the adjustment step size may also be negatively correlated with the maximum value of the distance interval. This may be determined based on a usage habit of the user, and is not limited in this embodiment of the present disclosure.

In this manner, the touch position of the touch operation may be used to determine the adjustment step size of the photographing parameter.

Manner 2

Optionally, the foldable display includes N foldable screen areas, and N is an integer greater than 2; and the determining an adjustment step size of the photographing parameter based on the touch position of the touch operation includes:

detecting whether the touch position of the touch operation is in a preset area; and in a case that the touch position of the touch operation is in the preset area, determining the adjustment step size of the photographing parameter based on a screen area corresponding to the folding angle change value.

It can be learned from the foregoing content that, in a case that the foldable display includes the N foldable screen areas, and N is an integer greater than 2, each folding angle corresponds to two adjacent foldable screen areas. In addition, when the folding angle changes, the folding angle change value is formed. Therefore, it can be understood that the folding angle change value corresponds to two adjacent foldable screen areas.

In this manner, the mobile terminal may prestore a correspondence between two adjacent foldable screen areas and the adjustment step size. During specific implementation, in a case that the touch position of the touch operation is in the preset area, after determining the screen area corresponding to the folding angle change value, the mobile terminal may determine an adjustment step size corresponding to the screen area as the adjustment step size of the photographing parameter.

In this manner, optionally, in the foregoing correspondence, an adjustment step size corresponding to each two adjacent foldable screen areas may be set based on a usage habit of the user. For example, in the foregoing correspondence, an adjustment step size corresponding to a screen area that is normally folded by the user may be greater than an adjustment step size corresponding to a screen area that is not normally folded. For example, if the user frequently uses a right hand, an adjustment step size corresponding to a screen area on the right may be set to be greater than an adjustment step size corresponding to a screen area on the left.

It should be noted that in this embodiment of the present disclosure, in a case that a plurality of folding angles of the foldable display change, that is, in a case that there are a plurality of folding angle change values of the foldable display, if there is a sequence in change times of the plurality of folding angles, the adjustment step size of the photographing parameter may be successively determined based on the sequence of the change times of the plurality of folding angles and screen areas corresponding to the folding angle change values; or if the plurality of folding angles change simultaneously, the mobile terminal may determine the adjustment step size of the photographing parameter based on a screen area corresponding to a target folding angle change value in the plurality of folding angle change values. The target folding angle change value may be a folding angle change value corresponding to two target adjacent screen areas, and the target adjacent screen areas may be set by default by a system of the mobile terminal or independently set by the user.

For ease of understanding, example descriptions are as follows:

It is assumed that the foldable display includes a screen area A, a screen area B, and a screen area C that are connected in sequence, the screen area A and the screen area B may form a first folding angle, and the first folding angle corresponds to the screen area A and the screen area B; and the screen area B and the screen area C may form a second folding angle, and the second folding angle corresponds to the screen area B and the screen area C.

In a scenario 1, the user folds the screen area A and keeps the screen area B and the screen area C unchanged, so that the first folding angle changes, and the mobile terminal may adjust the photographing parameter of the camera module based on an adjustment step size corresponding to the screen area A and the screen area B. Then, the user folds the screen area C and keeps the screen area A and the screen area B unchanged, so that the second folding angle changes, and the mobile terminal may adjust the photographing parameter of the camera module based on an adjustment step size corresponding to the screen area B and the screen area C.

In a scenario 2, the user folds both the screen area A and the screen area C and keeps the screen area B unchanged. In addition, if two target adjacent screen areas of the mobile terminal are the screen area A and the screen area B, the mobile terminal may adjust the photographing parameter of the camera module based on an adjustment step size corresponding to the screen area A and the screen area B.

In this manner, the touch position of the operation body in the preset area is a necessary trigger condition for the mobile terminal to adjust the photographing parameter.

In addition, in this implementation, for determining a weight coefficient of the adjustment step size, the mobile terminal may prestore a correspondence between a folding angle change interval and the weight coefficient. During specific implementation, after determining the change value of the folding angle, the mobile terminal may determine a folding angle change interval in which the folding angle change value falls, consider a weight coefficient corresponding to the folding angle change interval as a weight coefficient corresponding to the folding angle change value, and determine the weight coefficient as the weight coefficient of the adjustment step size.

In the foregoing correspondence, the weight coefficient may be positively correlated with a maximum value of the folding angle change interval. That is, if the maximum value of the folding angle change interval is larger, the weight coefficient corresponding to the folding angle change value is larger; otherwise, the weight coefficient corresponding to the folding angle change value is smaller.

Certainly, in the foregoing correspondence, the weight coefficient may also be negatively correlated with the maximum value of the folding angle change interval. This may be determined based on a usage habit of the user, and is not limited in this embodiment of the present disclosure.

In this implementation, after determining the adjustment step size and the weight coefficient, the mobile terminal may adjust the photographing parameter of the camera module in the following manners.

Manner 1: The mobile terminal may prestore a correspondence between the adjustment step size, the weight coefficient, and a photographing parameter value. In this way, the photographing parameter value corresponding to the adjustment step size and the weight coefficient may be determined by searching the foregoing correspondence, and the photographing parameter of the camera module is adjusted to the photographing parameter value.

Manner 2: Optionally, the adjusting the photographing parameter of the camera module based on the adjustment step size and the weight coefficient may include:

determining a photographing parameter change value based on the adjustment step size and the weight coefficient;

determining a second value based on a first value and the photographing parameter change value, where the first value is a value before the photographing parameter is adjusted; and adjusting the photographing parameter to the second value.

For ease of understanding, the photographing parameter change value is recorded as $\Delta F$, the first value is F1, and the second value is F2. During specific implementation, $F2=F1\pm\Delta F$.

If the adjustment step size is recorded as T and the weight coefficient is $\alpha$, $\Delta F=\alpha \times T$.

In actual application, whether the F2 is obtained through calculation by using the $F2=F1+\Delta F$ or $F2=F1-\Delta F$ further needs to be determined based on an adjustment direction of the photographing parameter.

In this embodiment, optionally, the adjusting a photographing parameter of the camera module based on a touch position of the touch operation and a folding angle of the foldable display includes:

adjusting the photographing parameter of the camera module based on the touch position of the touch operation, the folding angle of the foldable display, and an adjustment direction of the photographing parameter.

During specific implementation, if the adjustment direction is a first adjustment direction of decreasing a value of the photographing parameter, F2 may be obtained through calculation by using $F2=F1-\Delta F$. If the adjustment direction is a second adjustment direction of increasing a value of the photographing parameter, F2 is may be obtained through calculation by using $F2=F1+\Delta F$.

In this embodiment of the present disclosure, the adjustment direction of the photographing parameter may be determined in the following two manners.

Manner 1

Optionally, before the adjusting the photographing parameter of the camera module based on the touch position of the touch operation, the folding angle of the foldable display, and an adjustment direction of the photographing parameter, the method further includes:

determining the adjustment direction of the photographing parameter based on a folding direction of the foldable display.

Figure 5A:
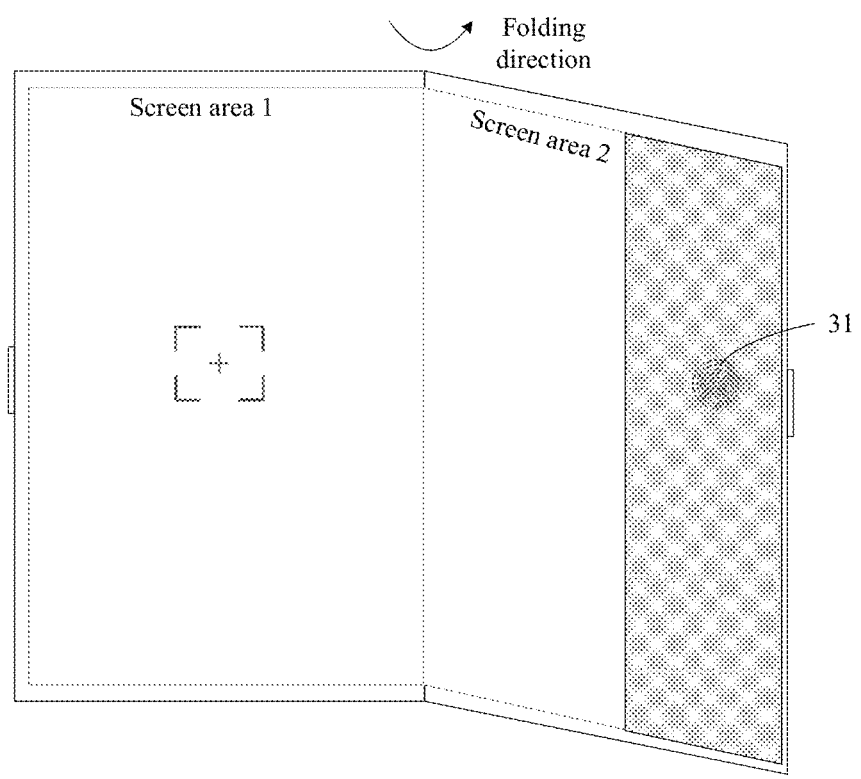
FIG. 5A is a fourth schematic diagram of a foldable display according to an embodiment of the present disclosure.
Figure 5B:
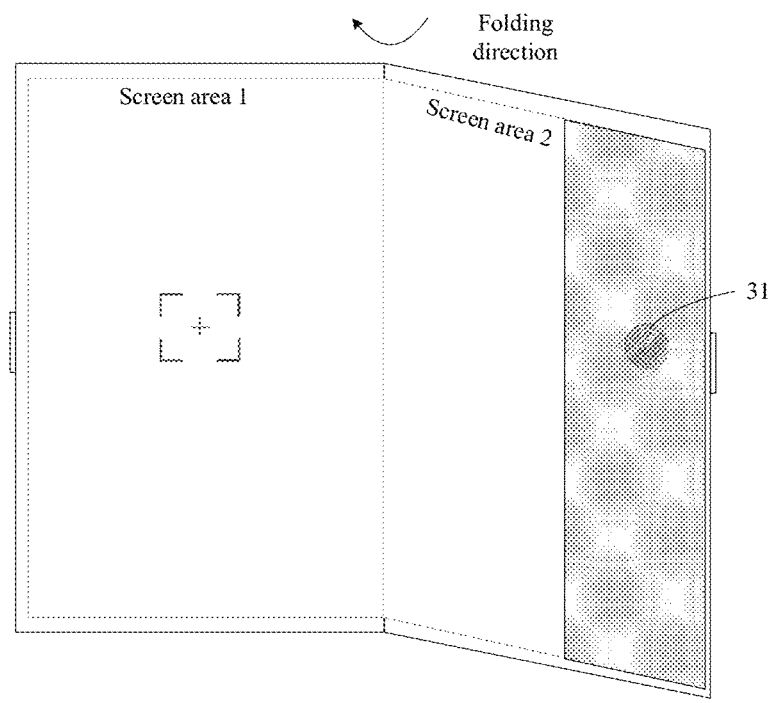
FIG. 5B is a fifth schematic diagram of a foldable display according to an embodiment of the present disclosure.

In this manner, the terminal may preset a correspondence between the folding direction and the adjustment direction. In the correspondence, as shown in FIG. 5A, a counterclockwise folding direction may correspond to the foregoing first adjustment direction. As shown in FIG. 5B, a clockwise folding direction may correspond to the foregoing second adjustment direction.

During specific implementation, after determining the folding direction of the foldable display, the mobile terminal may directly determine the adjustment direction corresponding to the folding direction as the adjustment direction.

Manner 2

Optionally, the foldable display includes N foldable screen areas, and N is an integer greater than 2; and before the adjusting the photographing parameter of the camera module based on the touch position of the touch operation, the folding angle of the foldable display, and an adjustment direction of the photographing parameter, the method further includes:

determining the adjustment direction of the photographing parameter based on the screen area corresponding to the change value of the folding angle.

It can be learned from the foregoing content that the folding angle change value corresponds to two adjacent foldable screen areas. Therefore, in this manner, a correspondence between two adjacent foldable screen areas and the adjustment direction may be prestored. For example, it is assumed that the foldable display includes a screen area A, a screen area B, and a screen area C that are connected in sequence. In the correspondence, the screen area A and the screen area B may correspond to the foregoing first adjustment direction, and the screen area B and the screen area C may correspond to the foregoing second adjustment direction.

During specific implementation, after determining the screen area corresponding to the folding angle change value, the mobile terminal may determine an adjustment direction corresponding to the screen area as the adjustment direction of the photographing parameter.

It should be noted that in this embodiment of the present disclosure, in a case that a plurality of folding angles of the foldable display change, that is, in a case that there are a plurality of folding angle change values of the foldable display, if there is a chronological order in change times of the plurality of folding angles, the adjustment direction of the photographing parameter may be successively determined based on the sequence of the change times of the plurality of folding angles and screen areas corresponding to the folding angle change values; or if the plurality of folding angles change simultaneously, the mobile terminal may determine the adjustment direction of the photographing parameter based on a screen area corresponding to a target folding angle change value in the plurality of folding angle change values. The target folding angle change value may be a folding angle change value corresponding to two target adjacent screen areas, and the target adjacent screen areas may be set by default by a system of the mobile terminal or independently set by the user.

For ease of understanding, example descriptions are as follows:

It is assumed that the foldable display includes a screen area A, a screen area B, and a screen area C that are connected in sequence, the screen area A and the screen area B may form a first folding angle, and the first folding angle corresponds to the screen area A and the screen area B; and the screen area B and the screen area C may form a second folding angle, and the second folding angle corresponds to the screen area B and the screen area C.

In a scenario 1, the user folds the screen area A and keeps the screen area B and the screen area C unchanged, so that the first folding angle changes, and the mobile terminal may adjust the photographing parameter of the camera module based on an adjustment direction corresponding to the screen area A and the screen area B. Then, the user folds the screen area C and keeps the screen area A and the screen area B unchanged, so that the second folding angle changes, and the mobile terminal may adjust the photographing parameter of the camera module based on an adjustment direction corresponding to the screen area B and the screen area C.

In a scenario 2, the user folds both the screen area A and the screen area C and keeps the screen area B unchanged. In addition, if two target adjacent screen areas of the mobile terminal are the screen area A and the screen area B, the mobile terminal may adjust the photographing parameter of the camera module based on an adjustment direction corresponding to the screen area A and the screen area B.

The following describes the implementation in which the mobile terminal may adjust the photographing parameter of the camera module based on the folding angle of the foldable display and the touch position of the touch operation.

An implementation principle of this implementation is basically the same as the implementation in which the mobile terminal may specifically adjust the photographing parameter of the camera module based on the folding angle of the foldable display and the touch position of the touch operation. A difference is mainly that the photographing parameter of the camera module is adjusted based on an actual folding angle of the foldable display in this implementation, and the photographing parameter of the camera module is adjusted based on the change value of the folding angle of the foldable display in the foregoing implementation. Therefore, for a specific implementation principle of this implementation, refer to the foregoing implementation. Details are not described herein again.

In this embodiment of the present disclosure, after receiving the folding operation performed on the foldable display in the process of receiving the touch operation, the mobile terminal may further detect whether the photographing parameter is in an adjustable state, and determine, based on a detection result, whether to adjust the photographing parameter of the camera module.

Optionally, the adjusting a photographing parameter of the camera module based on the touch position of the touch operation and the folding angle of the foldable display includes:

detecting whether the photographing parameter is in an adjustable state; and if the photographing parameter is in an adjustable state, adjusting the photographing parameter of the camera module based on the touch position of the touch operation and the folding angle of the foldable display; or if the photographing parameter is in an unadjustable state, in a case that a first input used to trigger the photographing parameter to be switched to an adjustable state is received, adjusting the photographing parameter of the camera module based on the touch position of the touch operation and the folding angle of the foldable display.

In an implementation, if the mobile terminal is preset with a target control used to lock/unlock adjustment if the photographing parameter, the first input may be a touch input for the target control. For example, the target control may be a power key, an artificial intelligence (AI) key, a volume key, or the like. In this implementation, if the photographing parameter is in an unadjustable state, in a case that the first input is received, adjustment of the photographing parameter is unlocked; otherwise, adjustment of the photographing parameter is locked.

It should be noted that, to avoid a function invoke conflict of the target control, in a scenario in which the photographing parameter is adjusted, the target control may be merely used to unlock/unlock the photographing parameter. For example, the target control is a power key. In a scenario in which the photographing parameter is adjusted, the power key is used to unlock/unlock adjustment of the photographing parameter, and is not used to control a power supply. In a scenario in which the photographing parameter is not adjusted, the power key is used to control the power supply, and is not used to unlock/unlock adjustment of the photographing parameter, thereby avoiding a function conflict of the power key.

In another implementation, the mobile terminal may preset a target track that is used to lock/unlock adjustment of the photographing parameter, and the first input may be an input whose input track matches the target track. For example, if the target track preset by the mobile terminal is "Δ", the mobile terminal may lock/unlock adjustment of the photographing parameter when detecting that the first input whose input track is "Δ". If the photographing parameter is in an unadjustable state, adjustment of the photographing parameter may be unlocked; otherwise, adjustment of the photographing parameter may be locked.

In addition, if the photographing parameter is in an unadjustable state and the first input is not received, the photographing parameter of the camera module may not be adjusted.

In this way, a probability that adjustment of the photographing parameter of the camera module is mistakenly triggered can be reduced.

In this embodiment of the present disclosure, optionally, after the adjusting a photographing parameter of the camera module based on a touch position of the touch operation and the folding angle of the foldable display, the method further includes:

detecting whether a second input is received, where the second input is used to restore a value of the photographing parameter to a first value, and the first value is a value before the photographing parameter is adjusted; and if the second input is received, restoring the value of the photographing parameter to the first value.

During specific implementation, the second input may be an operation of tapping the foldable display three times, but is not limited thereto. This may be specifically set based on an actual requirement, and is not limited in this embodiment of the present disclosure.

In this way, in a case that the second input is received, the value of the photographing parameter may be directly restored to the first value, and the photographing parameter does not need to be adjusted to the first value in another manner, thereby simplifying an operation of restoring the value of the photographing parameter to the first value, and improving operation efficiency.

In addition, in this embodiment of the present disclosure, optionally, the method further includes:

displaying a display bar of the photographing parameter, where the display bar is used to display a relationship between a current value of the photographing parameter and a preset maximum value of the photographing parameter.

Figure 6:
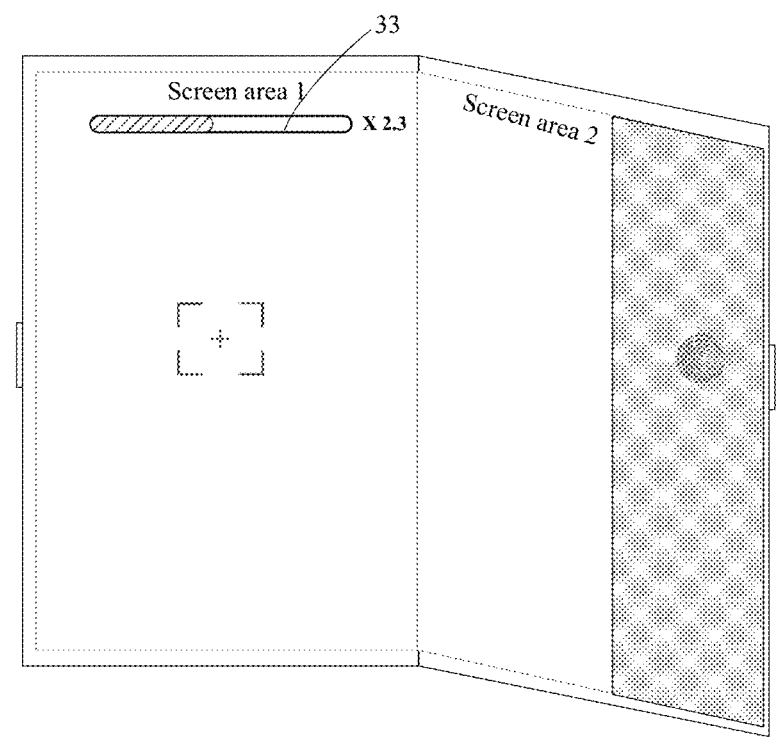
FIG. 6 is a sixth schematic diagram of a foldable display according to an embodiment of the present disclosure.

As shown in FIG. 6, the mobile terminal may display a display bar 31 above a screen area 1, and display a change multiple of the photographing parameter in real time behind the display bar 31. It should be understood that the display bar 31 in FIG. 6 is merely an example, and a specific display position and a display shape of the display bar are not limited in this embodiment of the present disclosure.

In this way, the user may learn the relationship between the current value of the photographing parameter and the preset maximum value of the photographing parameter by using the display bar, thereby avoiding invalid adjustment of the photographing parameter. For example, the photographing parameter has been adjusted to the preset maximum value, but the user considers that the photographing parameter does not reach the maximum value and further wants to increase the photographing parameter through adjustment. The photographing parameter is in an unadjustable state, but the user considers that the photographing parameter is in an adjustable state and adjusts the photographing parameter.

It should be noted that the plurality of optional implementations described in this embodiment of the present disclosure may be implemented in combination with each other, or may be separately implemented. This is not limited in this embodiment of the present disclosure.

For ease of understanding, the following uses an example in which the photographing parameter is a focal length and the foldable display includes a screen area 1 and a screen area 2 for description.

Figure 7:
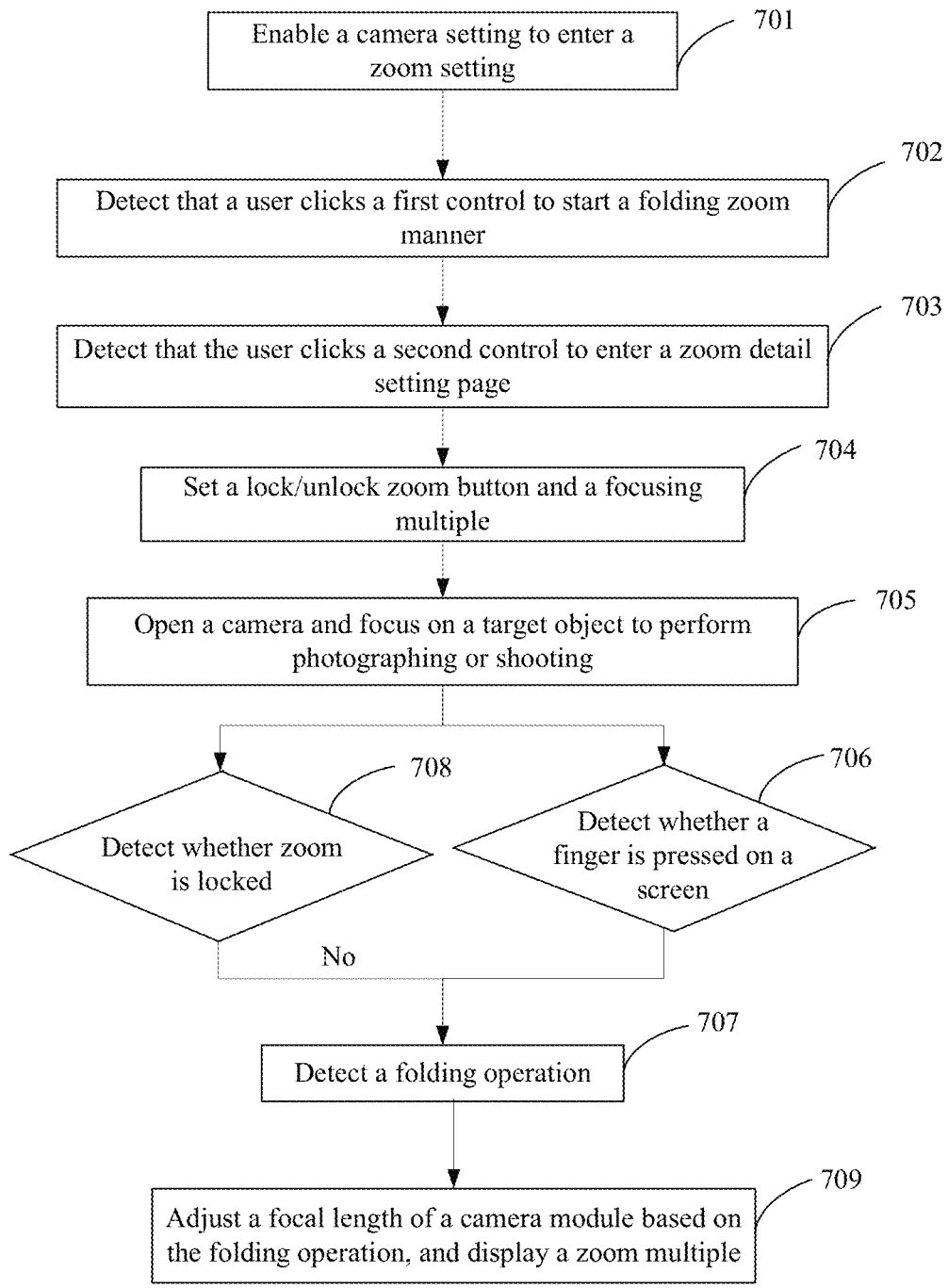
FIG. 7 is a second flowchart of a photographing parameter adjustment method according to an embodiment of the present disclosure.

Referring to FIG. 7, the photographing parameter adjustment method may include the following steps.

Step 701: Enable a camera setting to enter a zoom setting.

Figure 8A:
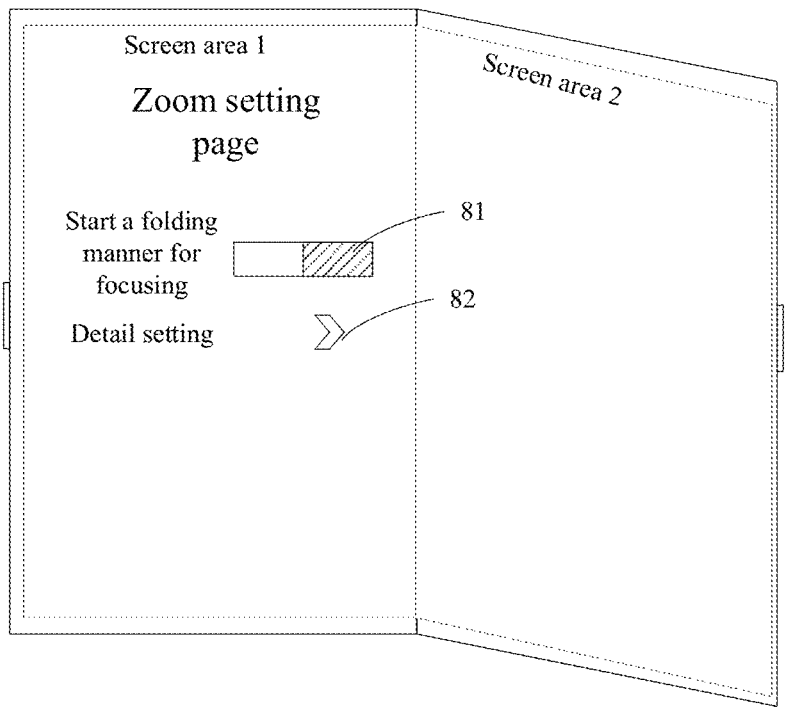
FIG. 8A is a seventh schematic diagram of a foldable display according to an embodiment of the present disclosure.

As shown in FIG. 8A, a zoom setting interface may include a first control 81 and a second control 82. The first control 81 is used to start/close a folding manner for focusing, and the second control 82 is used to start a folding manner for focusing and then enter a specific setting.

Step 702: Detect that a user clicks a first control to start a folding zoom manner.

It should be understood that, in this embodiment of the present disclosure, a mobile terminal may be compatible with a conventional focusing manner even if a folding focusing manner is started. In other words, the user may adjust perform focusing in the folding focusing manner and a transmission focusing manner.

Step 703: Detect that the user clicks a second control to enter a zoom detail setting page.

Figure 8B:
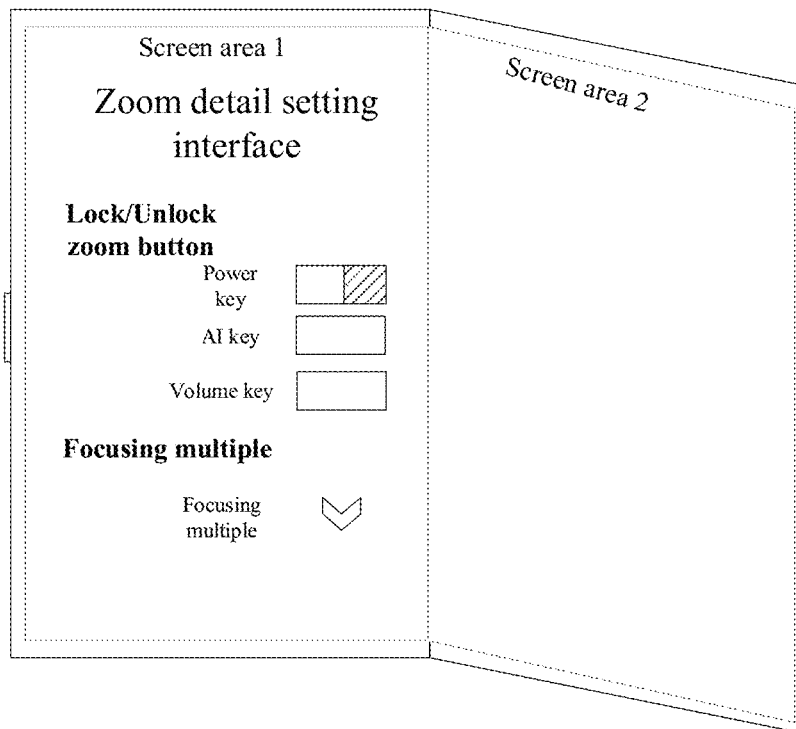
FIG. 8B is an eighth schematic diagram of a foldable display according to an embodiment of the present disclosure.

As shown in FIG. 8B, a lock/unlock zoom button may be set on the zoom detail setting interface. For example, the button may include a power key, an AI key, and a volume key, and space corresponding to the key may be displayed behind each key, to select the lock/unlock zoom button. In FIG. 8B, the user selects the power key as the lock/unlock zoom button.

As shown in FIG. 8B, a focusing multiple may be set on the zoom detail setting interface. The focusing multiple corresponds to a zoom multiple of a camera lens. A larger multiple indicates a larger zoom range in a same angle range. As shown in FIG. 8B, a pull-down button is tapped to select the focusing multiple.

Step 704: Set a lock/unlock zoom button and a focusing multiple.

It should be understood that step 701 to step 704 are setting steps. In actual application, after setting is completed, the photographing parameter adjustment method may not include step 701 to step 704.

Step 705: Open a camera and focus on a target object to perform photographing or shooting.

Step 706: Detect whether a finger is pressed on a screen. If yes, step 707 is performed.

Step 708: Detect whether zoom is locked. If no, step 707 is performed.

Step 707: Detect a folding operation.

Step 709: Adjust a focal length of a camera module based on the folding operation, and display a zoom multiple.

During specific implementation, the mobile terminal may perform zooming of the camera based on a change of an included angle between a folded display 1 and a folded display 2, and at the same time, a finger is pressed on a screen of the mobile phone. The included angle is inversely proportional to the zoom multiple. If the included angle is smaller, the zoom multiple is larger. When the included angle is 180 degrees, the zoom multiple does not change, that is, zooming is not performed. When the included angle is 90 degrees, the zoom multiple reaches a maximum value.

If different focusing steps (focusing precision) need to be used, a straight line distance between a finger pressing position and a bezel of the mobile phone is changed. Different distances correspond to different focusing steps. A focusing precision multiple may be dynamically changed by changing a finger position at any time.

The finger taps the screen three times to restore zooming immediately, that is, restore the zoom multiple to 0.

In this embodiment, if current focusing needs to be locked during focusing, zooming may be locked by tapping a corresponding setting button based on the foregoing lock/unlock zoom button. In this case, the included angle between the display 1 and the display 2 does not affect zooming. After locking, the key is pressed again to unlock zooming. After zooming is locked, a false touch and a misoperation can be avoided.

When the screen is being folded, a finger needs be pressed on a specified screen area. If the screen does not feel the pressing of the finger in the specified area, zooming is not performed on the foldable screen.

The straight line distance between the finger pressing position and the bezel of the mobile phone determines focusing precision, that is, a focusing multiple in a unit angle. If the distance is larger, the focusing multiple is larger. If the distance is smaller, the focusing multiple is smaller. If the user wants to perform focusing more quickly (coarse adjustment), the distance between the finger pressing position and the bezel is larger. If the user wants to perform focusing more finely (fine adjustment), the distance between the finger pressing position and the bezel is smaller. If it is detected that a plurality of fingers are pressed in a specified area on the screen, the nearest one prevails.

The finger continuously presses the screen three times to restore zooming immediately. In this interaction manner, zooming can be restored without folding the foldable screen to 180 degrees, thereby facilitating user operation.

There is a display bar in the screen area 1, a ratio of the zoom multiple to a maximum multiple is displayed in real time, and the zoom multiple is displayed on the right side. After zooming is locked, the display bar and zoom multiple are no longer displayed.

In this embodiment, different angles are generated between the screen area 1 and the screen area 2 based on a folding operation performed on a dual-screen foldable mobile phone. It should be understood that this embodiment of the present disclosure may also be applied to a multi-screen foldable mobile phone (for example, three-screen folding). For multi-screen folding, more operations may be set. For example, for three-screen folding, different effects may be set when the two screens on the left and right are separately folded, such as coarse adjustment and fine adjustment, zooming out, and zooming in.

In this embodiment of the present disclosure, zooming of a camera lens may be controlled by using an angle generated between different screen areas through a folding operation performed on a foldable display. An adjustment step size is controlled based on a touching position of the operation body on the foldable display.

In this embodiment of the present disclosure, the folding operation and touching of the operation body are used to control a photographing parameter of a camera module by using different folding angles and different touch positions. During folding, whether to adjust the photographing parameter of the camera module is determined based on whether the operation body touches the foldable display. A zoom step (a same folding angle and a different zoom multiple) may be adjusted based on a distance between a touch position and a first side.

This embodiment of the present disclosure has at least the following beneficial effects:

Appearance of a mobile terminal with a foldable screen gives the mobile terminal more operation manners, thereby providing a more convenient manner for various user interactions. An included angle between different screens is formed through a folding operation the mobile terminal with the foldable screen, to control zooming of a camera lens. This is fast and intuitive to facilitate photographing of the mobile terminal, and is applicable to the mobile terminal with the foldable screen. To enable the user to quickly switch between zooming/no zooming, a finger needs to be pressed on the screen during folding, to implement zooming. In addition, adjustment step sizes are different because finger pressing positions are different, so that various manners of focusing precision are met. In addition, zooming may be unlocked/locked at any time, so that a false touch and a misoperation can be avoided and this manner has strong applicability and practicability. In particular, currently, large-multiple optical zooming is a trend of the camera of the mobile terminal. If a zoom multiple is increasingly large, and a requirement for fine adjustment is increasingly high. This interaction manner designed in this specification can better adapt to this change. In addition, it brings convenience to the user, and provides a sense of science and technology for products.

Figure 9:
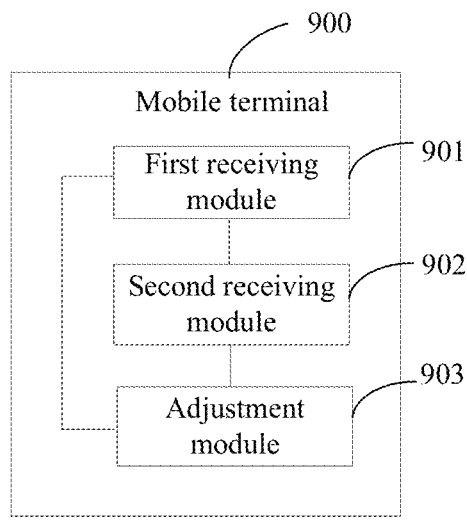
FIG. 9 is a first structural diagram of a mobile terminal according to an embodiment of the present disclosure.

Referring to FIG. 9, FIG. 9 is a first structural diagram of a mobile terminal according to an embodiment of the present disclosure. The mobile terminal includes a camera module and a foldable display. As shown in FIG. 9, a mobile terminal 900 includes:

a first receiving module 901, configured to receive a touch operation performed on the foldable display;

a second receiving module 902, configured to: in a process of receiving the touch operation, receive a folding operation performed on the foldable display; and an adjustment module 903, configured to adjust a photographing parameter of the camera module based on a touch position of the touch operation and a folding angle of the foldable display.

Optionally, the adjustment module 903 includes:

a first determining unit, configured to determine an adjustment step size of the photographing parameter based on the touch position of the touch operation;

a second determining unit, configured to determine a weight coefficient of the adjustment step size based on a change value of the folding angle of the foldable display; and an adjustment unit, configured to adjust the photographing parameter of the camera module based on the adjustment step size and the weight coefficient.

Optionally, the first determining unit is further configured to:

determine a shortest distance between the touch position of the touch operation and a first side of the foldable display; and determine an adjustment step size corresponding to the shortest distance as the adjustment step size of the photographing parameter.

Optionally, the foldable display includes N foldable screen areas, and N is an integer greater than 2; and the first determining unit is configured to:

in a case that the touch position of the touch operation is in a preset area, determine the adjustment step size of the photographing parameter based on a screen area corresponding to the change value of the folding angle.

Optionally, the adjustment module 903 is configured to:

adjust the photographing parameter of the camera module based on the touch position of the touch operation, the folding angle of the foldable display, and an adjustment direction of the photographing parameter.

Optionally, the mobile terminal further includes:

a third determining module, configured to: before the photographing parameter of the camera module is adjusted based on the touch position of the touch operation, the folding angle of the foldable display, and the adjustment direction of the photographing parameter, determine the adjustment direction of the photographing parameter based on a folding direction of the foldable display.

Optionally, the foldable display includes N foldable screen areas, and N is an integer greater than 2; and the mobile terminal further includes:

a fourth determining module, configured to: before the photographing parameter of the camera module is adjusted based on the touch position of the touch operation, the folding angle of the foldable display, and the adjustment direction of the photographing parameter, determine the adjustment direction of the photographing parameter based on the screen area corresponding to the change value of the folding angle.

The mobile terminal 900 can implement the processes in the method embodiment in the present disclosure and achieve a same beneficial effect. To avoid repetition, details are not described herein again.

In this embodiment, the mobile terminal may adjust the photographing parameter of the camera module based on the touch position of the touch operation and the folding angle of the foldable display by using the adjustment module 903. It can be learned that a user may adjust the photographing parameter of the camera module by performing the folding operation on the foldable display, so that adjustment of the photographing parameter of the camera module is more easily controlled than that in the related art, thereby improving operation efficiency of adjusting the photographing parameter.

Figure 10:
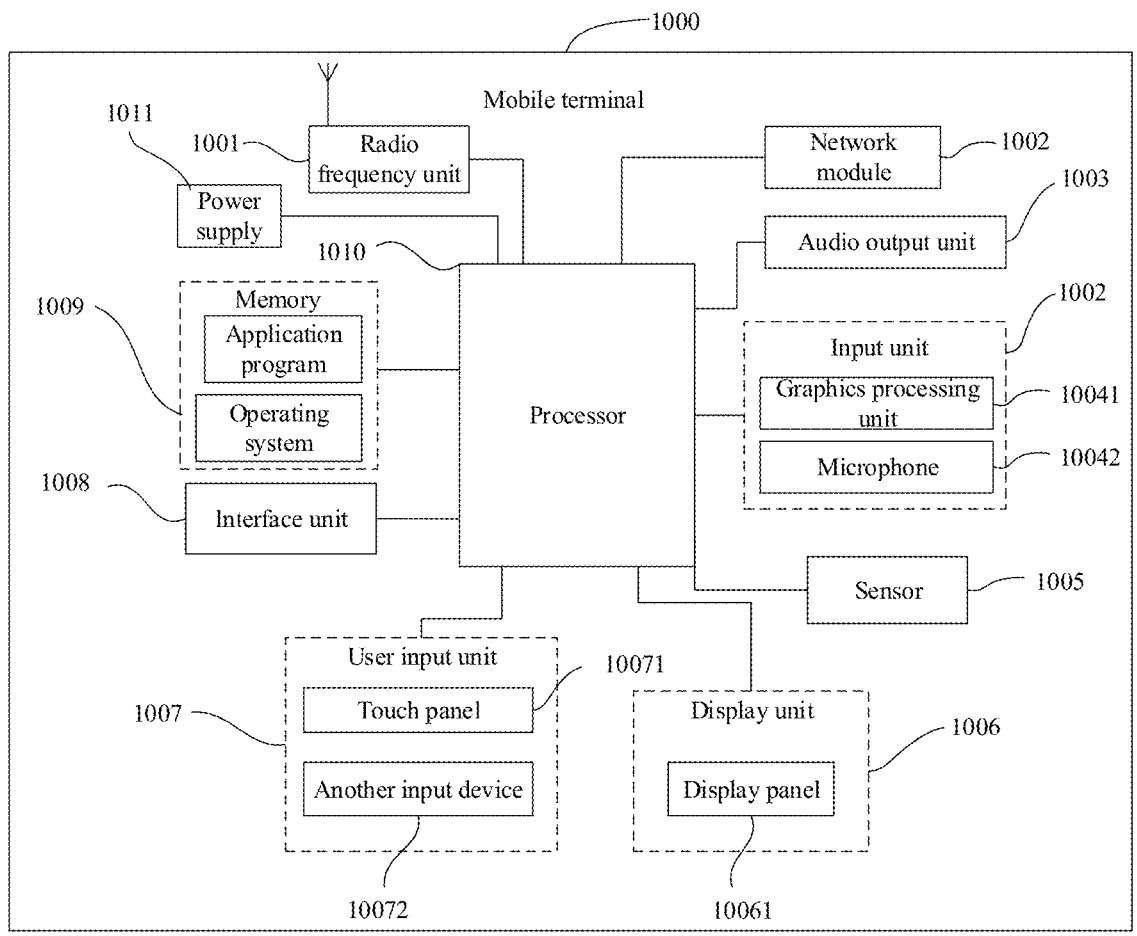
FIG. 10 is a second structural diagram of a mobile terminal according to an embodiment of the present disclosure.

Referring to FIG. 10, FIG. 10 is a second structural diagram of a mobile terminal according to an embodiment of the present disclosure. The mobile terminal may be a schematic diagram of a hardware structure of a mobile terminal that implements the embodiments of the present disclosure. The mobile terminal includes a camera module and a foldable display. As shown in FIG. 10, the mobile terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that a structure of the mobile terminal shown in FIG. 10 does not constitute a limitation on the mobile terminal, and the mobile terminal may include more or fewer components than those shown in the figure, or combine some components, or have different component arrangements. In this embodiment of the present disclosure, the mobile terminal includes but is not limited to a mobile phone, a tablet computer, a notebook computer, a palmtop computer, an in-vehicle terminal, a wearable device, a pedometer, and the like.

The user input unit 1007 is configured to:

receive a touch operation performed on the foldable display; and in a process of receiving the touch operation, receive a folding operation performed on the foldable display; and the processor 1010 is configured to:

adjust a photographing parameter of the camera module based on a touch position of the touch operation and a folding angle of the foldable display.

Optionally, the processor 1010 is further configured to:

determine an adjustment step size of the photographing parameter based on the touch position of the touch operation;

determine a weight coefficient of the adjustment step size based on a change value of the folding angle of the foldable display; and adjust the photographing parameter of the camera module based on the adjustment step size and the weight coefficient.

Optionally, the processor 1010 is further configured to:

determine a shortest distance between the touch position of the touch operation and a first side of the foldable display; and determine an adjustment step size corresponding to the shortest distance as the adjustment step size of the photographing parameter.

Optionally, the foldable display includes N foldable screen areas, and N is an integer greater than 2; and the processor 1010 is further configured to:

in a case that the touch position of the touch operation is in a preset area, determine the adjustment step size of the photographing parameter based on a screen area corresponding to the change value of the folding angle.

Optionally, the processor 1010 is further configured to:

adjust the photographing parameter of the camera module based on the touch position of the touch operation, the folding angle of the foldable display, and an adjustment direction of the photographing parameter.

Optionally, the processor 1010 is further configured to:

determine the adjustment direction of the photographing parameter based on a folding direction of the foldable display.

Optionally, the foldable display includes N foldable screen areas, and N is an integer greater than 2; and the processor 1010 is further configured to:

determine the adjustment direction of the photographing parameter based on the screen area corresponding to the change value of the folding angle.

It should be noted that in this embodiment, the foregoing mobile terminal 1000 can implement the processes in the method embodiment in the embodiments of the present disclosure, and achieve a same beneficial effect. To avoid repetition, details are not described herein again.

In this embodiment, the mobile terminal may adjust the photographing parameter of the camera module based on the touch position of the touch operation and the folding angle of the foldable display by using the processor 1010. It can be learned that a user may adjust the photographing parameter of the camera module by performing the folding operation on the foldable display, so that adjustment of the photographing parameter of the camera module is more easily controlled than that in the related art, thereby improving operation efficiency of adjusting the photographing parameter.

It should be understood that, in this embodiment of the present disclosure, the radio frequency unit 1001 may be configured to receive and send information or a signal in a call process. For example, after receiving downlink data from a base station, the radio frequency unit 1001 sends the downlink data to the processor 1010 for processing. In addition, the radio frequency unit 1001 sends uplink data to the base station. Generally, the radio frequency unit 1001 includes but is not limited to an antenna, at least one amplifier, a transceiver, a coupler, a low noise amplifier, and a duplexer. In addition, the radio frequency unit 1001 may communicate with a network and another device through a wireless communication system.

The mobile terminal provides wireless broadband Internet access for the user by using the network module 1002, for example, helping the user to send and receive an e-mail, brows a web page, and access streaming media.

The audio output unit 1003 may convert, into an audio signal, audio data received by the radio frequency unit 1001 or the network module 1002 or stored in the memory 1009, and output the audio signal as sound. In addition, the audio output unit 1003 may further provide an audio output (for example, a call signal received voice, or a message received voice) related to a specific function implemented by the mobile terminal 1000. The audio output unit 1003 includes a loudspeaker, a buzzer, a telephone receiver, and the like.

The input unit 1004 is configured to receive an audio signal or a video signal. The input unit 1004 may include a graphics processing unit (GPU) 10041 and a microphone 10042, and the graphics processing unit 10041 processes image data of a still picture or video obtained by an image capture apparatus (such as a camera) in a video capture mode or an image capture mode. A processed image frame may be displayed on the display unit 1006. The image frame processed by the graphics processing unit 10041 may be stored in the memory 1009 (or another storage medium) or sent by using the radio frequency unit 1001 or the network module 1002. The microphone 10042 may receive a sound and can process such sound into audio data. The processed audio data may be converted in a telephone call mode into a format that can be sent by the radio frequency unit 1001 to a mobile communications base station for output.

The mobile terminal 1000 may further include at least one sensor 1005 such as an optical sensor, a motion sensor, or another sensor. For example, the optical sensor includes an ambient optical sensor and a proximity sensor. The ambient optical sensor may adjust luminance of the display panel 10061 based on brightness of ambient light, and the proximity sensor may disable the display panel 10061 and/or backlight when the mobile terminal 1000 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information entered by a user or information provided for a user. The display unit 1006 may include the display panel 10061, and the display panel 10061 may be configured in a form of a liquid crystal display (LCD), an organic light-emitting diode (OLED), or the like.

The user input unit 1007 may be configured to: receive digit or character information that is input, and generate key signal input related to user setting and function control of the mobile terminal. For example, the user input unit 1007 includes a touch panel 10071 and another input device 10072. The touch panel 10071 is also referred to as a touchscreen, and may collect a touch operation performed by a user on or near the touch panel 10071 (such as an operation performed by a user on the touch panel 10071 or near the touch panel 10071 by using any proper object or accessory, such as a finger or a stylus). The touch panel 10071 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch point coordinates, sends the touch point coordinates to the processor 1010, and receives and executes a command sent by the processor 1010. In addition, the touch panel 10071 may be implemented by using a plurality of types such as a resistive type, a capacitive type, an infrared ray, and a surface acoustic wave. The user input unit 1007 may include the another input device 10072 in addition to the touch panel 10071. The another input device 10072 may include but is not limited to a physical keyboard, a functional button (such as a volume control button or a power on/off button), a trackball, a mouse, and a joystick. Details are not described herein.

The touch panel 10071 may cover the display panel 10061. When detecting the touch operation on or near the touch panel 10071, the touch panel 10071 transmits the touch operation to the processor 1010 to determine a type of a touch event, and then the processor 1010 provides corresponding visual output on the display panel 10061 based on the type of the touch event. In FIG. 10, although the touch panel 10071 and the display panel 10061 are used as two independent parts to implement input and input functions of the mobile terminal, in some embodiments, the touch panel 10071 and the display panel 10061 may be integrated to implement the input and output functions of the mobile terminal. This is not specifically limited herein.

The interface unit 1008 is an interface for connecting an external apparatus with the mobile terminal 1000. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 1008 may be configured to receive input (such as data information and power) from the external apparatus and transmit the received input to one or more elements in the mobile terminal 1000, or may be configured to transmit data between the mobile terminal 1000 and the external apparatus.

The memory 1009 may be configured to store a software program and various data. The memory 1009 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1009 may include a high-speed random access memory, and may further include a nonvolatile memory, for example, at least one magnetic disk storage device, a flash storage device, or another volatile solid-state storage device.

The processor 1010 is a control center of the mobile terminal and is connected to all the parts of the entire mobile terminal by using various interfaces and lines, and performs various functions of the mobile terminal and data processing by running or executing the software program and/or module that are/is stored in the memory 1009 and by invoking data stored in the memory 1009, so as to perform overall monitoring on the mobile terminal. The processor 1010 may include one or more processing units. Optionally, an application processor and a modem processor may be integrated into the processor 1010. The application processor mainly processes an operating system, a user interface, an application program, and the like. The modem processor mainly processes wireless communications. It can be understood that, alternatively, the modem processor may not be integrated into the processor 1010.

The mobile terminal 1000 may further include a power supply 1011 (such as a battery) that supplies power to each component. Optionally, the power supply 1011 may be logically connected to the processor 1010 by using a power supply management system, to implement functions such as charging, discharging, and power consumption management by using the power supply management system.

In addition, the mobile terminal 1000 includes some function modules not shown, and details are not described herein.

Optionally, an embodiment of the present disclosure further provides a mobile terminal, including a processor 1010, a memory 1009, and a computer program that is stored in the memory 1009 and executable on the processor 1010. When the computer program is executed by the processor 1010, the processes of the foregoing photographing parameter adjustment method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the processes of the foregoing photographing parameter adjustment method embodiment are implemented and a same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without being subject to further limitations, an element defined by a phrase "including a . . . " does not exclude presence of other identical elements in the process, method, article, or apparatus that includes the very element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

In an implementation process, the steps in the foregoing method or the foregoing modules can be implemented by using a hardware integrated logical circuit in the processing element, or by using instructions in a form of software. The modules, units, subunits, or submodules may be configured as one or more integrated circuits for implementing the foregoing method, for example, one or more application specific integrated circuits (ASICs), one or more digital signal processors (DSPs), or one or more field programmable gate arrays (FPGAs). For another example, when one of the foregoing modules is implemented in the form of program code being scheduled by a processing element, the processing element may be a general-purpose processor, such as a central processing unit (CPU) or another processor that can invoke program code. For another example, these modules may be integrated together, and implemented in the form of a system-on-a-chip (SOC).

In the specification and claims of the present disclosure, the terms "first", "second", and the like are intended to distinguish between similar objects but do not necessarily describe a specific order or sequence. It should be understood that such used data is exchangeable in a proper case, so that the embodiments of the present disclosure described herein, for example, can be implemented in sequences other than those shown in the figures or described herein. In addition, terms "include", "have", and any variant thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in the specification and claims, "and/or" is used to indicate at least one of connected objects, for example, A and/or B and/or C indicates seven cases: only A, only B, only C, both A and B, both B and C, both A and C, and A, B and C. Similarly, the use of "at least one of A and B" in this specification and claims should be understood as "only A, only B, or both A and B".

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection scope of the present disclosure.

What is claimed is:

1. A photographing parameter adjustment method, applied to a mobile terminal, wherein the mobile terminal comprises a camera module and a foldable display, and the method comprises:
   receiving a touch operation performed on the foldable display;
   in a process of receiving the touch operation, receiving a folding operation performed on the foldable display; and
   adjusting a photographing parameter of the camera module based on a touch position of the touch operation and a folding angle of the foldable display,
   wherein the adjusting a photographing parameter of the camera module based on a touch position of the touch operation and a folding angle of the foldable display comprises:
   determining an adjustment step size of the photographing parameter based on the touch position of the touch operation;
   determining a weight coefficient of the adjustment step size based on a change value of the folding angle of the foldable display; and
   adjusting the photographing parameter of the camera module based on the adjustment step size and the weight coefficient.

2. The method according to claim 1, wherein the determining an adjustment step size of the photographing parameter based on the touch position of the touch operation comprises:
   determining a shortest distance between the touch position of the touch operation and a first side of the foldable display; and
   determining an adjustment step size corresponding to the shortest distance as the adjustment step size of the photographing parameter.

3. The method according to claim 1, wherein the foldable display comprises N foldable screen areas, and N is an integer greater than 2; and
   the determining an adjustment step size of the photographing parameter based on the touch position of the touch operation comprises:
   in a case that the touch position of the touch operation is in a preset area, determining the adjustment step size of the photographing parameter based on a screen area corresponding to the change value of the folding angle.

4. The method according to claim 1, wherein the adjusting the photographing parameter of the camera module based on the adjustment step size and the weight coefficient comprises:
   determining a photographing parameter value corresponding to the adjustment step size and the weight coefficient, according to a correspondence between adjustment step sizes, weight coefficients, and photographing parameter values; and
   adjusting the photographing parameter of the camera module to the photographing parameter value.

5. The method according to claim 1, wherein the adjusting the photographing parameter of the camera module based on the adjustment step size and the weight coefficient comprises:
   determining a photographing parameter change value, according to the adjustment step size and the weight coefficient;
   determining a second value, according to a first value and the photographing parameter change value, the first value being a value of the photographing parameter of the camera module before adjustment; and adjusting the photographing parameter of the camera module to the second value.

6. A mobile terminal, comprising a processor, a memory, and a computer program that is stored in the memory and executable on the processor, wherein the computer program, when executed by the processor, causes the mobile terminal to perform:

receiving a touch operation performed on a foldable display of the mobile terminal;

in a process of receiving the touch operation, receiving a folding operation performed on the foldable display; and adjusting a photographing parameter of a camera module of the mobile terminal based on a touch position of the touch operation and a folding angle of the foldable display, wherein the computer program, when executed by the processor, causes the mobile terminal to perform:

determining an adjustment step size of the photographing parameter based on the touch position of the touch operation;

determining a weight coefficient of the adjustment step size based on a change value of the folding angle of the foldable display; and adjusting the photographing parameter of the camera module based on the adjustment step size and the weight coefficient.

7. The mobile terminal according to claim 6, wherein the computer program, when executed by the processor, causes the mobile terminal to perform:

determining a shortest distance between the touch position of the touch operation and a first side of the foldable display; and determining an adjustment step size corresponding to the shortest distance as the adjustment step size of the photographing parameter.

8. The mobile terminal according to claim 6, wherein the foldable display comprises N foldable screen areas, and N is an integer greater than 2; and the computer program, when executed by the processor, causes the mobile terminal to perform:

in a case that the touch position of the touch operation is in a preset area, determining the adjustment step size of the photographing parameter based on a screen area corresponding to the change value of the folding angle.

9. The mobile terminal according to claim 6, wherein the computer program, when executed by the processor, causes the mobile terminal to perform:

determining a photographing parameter value corresponding to the adjustment step size and the weight coefficient, according to a correspondence between adjustment step sizes, weight coefficients, and photographing parameter values; and adjusting the photographing parameter of the camera module to the photographing parameter value.

10. The mobile terminal according to claim 6, wherein the computer program, when executed by the processor, causes the mobile terminal to perform:

determining a photographing parameter change value, according to the adjustment step size and the weight coefficient;

determining a second value, according to a first value and the photographing parameter change value, the first value being a value of the photographing parameter of the camera module before adjustment; and adjusting the photographing parameter of the camera module to the second value.

11. A non-transitory computer-readable storage medium, wherein non-transitory the computer-readable storage medium stores a computer program, and the computer program, when executed by a processor of a mobile terminal, causes the mobile terminal to perform:

receiving a touch operation performed on a foldable display of the mobile terminal;

in a process of receiving the touch operation, receiving a folding operation performed on the foldable display; and adjusting a photographing parameter of a camera module of the mobile terminal based on a touch position of the touch operation and a folding angle of the foldable display, wherein the computer program, when executed by the processor, causes the mobile terminal to perform:

determining an adjustment step size of the photographing parameter based on the touch position of the touch operation;

determining a weight coefficient of the adjustment step size based on a change value of the folding angle of the foldable display; and adjusting the photographing parameter of the camera module based on the adjustment step size and the weight coefficient.

12. The non-transitory computer-readable storage medium according to claim 11, wherein the computer program, when executed by the processor, causes the mobile terminal to perform:

determining a shortest distance between the touch position of the touch operation and a first side of the foldable display; and determining an adjustment step size corresponding to the shortest distance as the adjustment step size of the photographing parameter.

13. The non-transitory computer-readable storage medium according to claim 11, wherein the foldable display comprises N foldable screen areas, and N is an integer greater than 2; and the computer program, when executed by the processor, causes the mobile terminal to perform:

in a case that the touch position of the touch operation is in a preset area, determining the adjustment step size of the photographing parameter based on a screen area corresponding to the change value of the folding angle.

14. The non-transitory computer-readable storage medium according to claim 11, wherein the computer program, when executed by the processor, causes the mobile terminal to perform:

determining a photographing parameter value corresponding to the adjustment step size and the weight coefficient, according to a correspondence between adjustment step sizes, weight coefficients, and photographing parameter values; and adjusting the photographing parameter of the camera module to the photographing parameter value.

15. The non-transitory computer-readable storage medium according to claim 11, wherein the computer program, when executed by the processor, causes the mobile terminal to perform:

determining a photographing parameter change value, according to the adjustment step size and the weight coefficient;

determining a second value, according to a first value and the photographing parameter change value, the first value being a value of the photographing parameter of the camera module before adjustment; and adjusting the photographing parameter of the camera module to the second value.

* * * * *